(12) United States Patent
Zhang (10) Patent No.: US 11,874,024 B2
(45) Date of Patent: Jan. 16, 2024

(54) HUMIDIFIER

(71) Applicant: Shenzhen Chenbei Technology Co., Ltd., Shenzhen (CN)

(72) Inventor: Yixiong Zhang, Shenzhen (CN)

( * ) Notice: Subject to any disclaimer, the term of this patent is extended or adjusted under 35 U.S.C. 154(b) by 0 days.

(21) Appl. No.: 17/853,967

(22) Filed: Jun. 30, 2022

(65) Prior Publication Data

US 2023/0003402 A1   Jan. 5, 2023

(30) Foreign Application Priority Data

Jun. 30, 2021   (CN) .......................... 202110736105.3

(51) Int. Cl.
*F24F 6/14* (2006.01)
*F24F 13/20* (2006.01)
*F24F 6/00* (2006.01)

(52) U.S. Cl.
CPC ................ *F24F 6/14* (2013.01); *F24F 13/20* (2013.01); *F24F 2006/008* (2013.01); *F24F 2006/143* (2013.01)

(58) Field of Classification Search
CPC ........ F24F 6/14; F24F 13/20; F24F 2006/008; F24F 2006/143; F24F 6/12; F24F 13/08; Y02B 30/70
See application file for complete search history.

(56) References Cited

U.S. PATENT DOCUMENTS

| | | | | |
|---|---|---|---|---|
| 4,921,639 | A * | 5/1990 | Chiu | F24F 6/12 261/81 |
| 7,182,321 | B2 * | 2/2007 | Huang | F24F 6/00 261/66 |
| 10,168,064 | B1 * | 1/2019 | Zhang | F24F 6/12 |
| 2006/0018977 | A1 * | 1/2006 | Bruza | A01N 25/10 424/701 |
| 2006/0118977 | A1 * | 6/2006 | Huang | F24F 6/00 261/DIG. 65 |
| 2007/0176306 | A1 * | 8/2007 | Huang | F24F 6/00 261/DIG. 65 |
| 2010/0243432 | A1 * | 9/2010 | Ikemizu | F24F 6/043 422/186 |

(Continued)

FOREIGN PATENT DOCUMENTS

CN   111043690   *   4/2020
EP   1832817 A2 *   9/2007   ............. A61L 9/145

OTHER PUBLICATIONS

EPO translation of CN111043690 (Year: 2020).*

*Primary Examiner* — Stephen Hobson
(74) *Attorney, Agent, or Firm* — Tsz Lung Yeung (57) ABSTRACT

The application discloses a humidifier with a mist outlet, including a water tank; a seat provided with a water groove for receiving water from the water tank and a heating cavity; a first water channel provided on the seat, communicated the water groove with the heating cavity; and a first air duct enabling airflow introduced by an air inlet component to flow through the first water channel to cool the water in the first water channel, and enabling the airflow to flow to the mist outlet of the humidifier after flowing through the first water channel. When the heat in the heating cavity is transferred to the first water channel, the water in the first water channel can be purged by the airflow guided by the first air duct to cool the water. This prevents an increase in a temperature of a humidifier housing.

8 Claims, 9 Drawing Sheets

(56) References Cited

U.S. PATENT DOCUMENTS

| | | | |
|---|---|---|---|
| 2012/0234166 A1* | 9/2012 | Markham | F24F 6/18 |
| | | | 95/149 |
| 2012/0319311 A1* | 12/2012 | Nutter | A61L 9/20 |
| | | | 250/437 |
| 2015/0054183 A1* | 2/2015 | Chen | F24F 13/00 |
| | | | 261/150 |
| 2016/0138818 A1* | 5/2016 | Fitsch | C02F 1/325 |
| | | | 261/36.1 |
| 2016/0356514 A1* | 12/2016 | Cai | F24F 13/20 |
| 2017/0336086 A1* | 11/2017 | Lin | A61M 16/109 |
| 2018/0029065 A1* | 2/2018 | Chiang | B05B 14/00 |
| 2018/0147594 A1* | 5/2018 | Kim | F24F 6/12 |
| 2019/0049133 A1* | 2/2019 | Cai | A61L 9/015 |
| 2019/0072289 A1* | 3/2019 | Lai | B01F 23/20 |
| 2019/0293309 A1* | 9/2019 | Cai | F24F 6/12 |
| 2020/0200410 A1* | 6/2020 | Peng | B65D 1/0246 |
| 2020/0263884 A1* | 8/2020 | Cao | F24F 13/30 |
| 2020/0378618 A1* | 12/2020 | Hall | F24F 5/0089 |
| 2021/0010697 A1* | 1/2021 | Lotfi | F24F 13/20 |
| 2021/0018194 A1* | 1/2021 | Liu | F24F 6/025 |
| 2023/0129864 A1* | 4/2023 | Verhoeven | F24F 6/00 |
| | | | 422/3 |

\* cited by examiner

HUMIDIFIER

CROSS REFERENCE

This is a non-provisional application which claims priority to a Chinese patent application having an application number of CN202110736105.3, and a filing date of Jun. 30, 2021, the entire contents of which is hereby incorporated by reference.

TECHNICAL FIELD

The application relates to the field of household appliance technologies, and in particular, to a humidifier.

BACKGROUND

At present, humidifiers that can generate hot mist on the market need to heat water in a heating cavity to generate steam. When the water is heated in the heating cavity, the heat is transferred through the water to a water channel used to convey the water to the heating cavity or even a water groove communicated with the water channel. Because the water channel and the water groove are disposed inside the humidifier close to a housing of the humidifier, if the heat is transferred to the water channel and the water groove, the housing of the humidifier heats up. In this case, a working performance of the humidifier is affected, and a user may feel hot when touching the humidifier, leading to poor user experience.

SUMMARY

In view of the above, the application provides a humidifier which can improve a working performance and enables a user to have better user experience.

To achieve the foregoing objective, the application provides the following technical solution:

A humidifier with a mist outlet, comprising:
  a water tank; a seat provided with a water groove for receiving water flowing out of the water tank and a heating cavity for heating the water; a first water channel provided on the seat, and configured to communicate the water groove with the heating cavity, so that the water is capable of flowing into the heating cavity via the water groove; and a first air duct enabling airflow introduced by an air inlet component to flow through the first water channel to cool the water in the first water channel, and enabling the airflow to flow to the mist outlet after flowing through the first water channel.

In an embodiment, the humidifier further comprises: an atomization cavity provided on the seat; a second air duct configured to communicate the air inlet component with the atomization cavity, and enable the airflow introduced by the air inlet component to flow through the atomization cavity to accelerate the flow of mist toward the mist outlet; and a third air duct configured to communicate the air inlet component with the heating cavity, and enable the airflow introduced by the air inlet component to flow through the heating cavity to accelerate the flow of heated airflow toward the mist outlet.

In an embodiment, the seat is provided with a covering part, and the covering part comprises a first cover body part covering the atomization cavity and the first water channel, the first cover body part is provided with a first airflow inlet and a cover body opening that are communicated with the atomization cavity, and the airflow introduced by the air inlet component is capable of entering the atomization cavity from the first airflow inlet and flowing out from the cover body opening; and the first cover body part is further provided with a first airflow outlet communicated with the first airflow inlet and a space above the first water channel, and the airflow introduced by the air inlet component is capable of flowing into the first cover body part from the first airflow inlet and passes above the first water channel and then flows out through the first airflow outlet.

In an embodiment, the covering part further comprises a second cover body part covering the heating cavity, and by covering the heating cavity, the second cover body part is capable of implementing sound proofing of the heating cavity and preventing water from splashing out from the heating cavity, and the second cover body part is provided with a second airflow inlet communicated with the heating cavity and enabling the airflow introduced by the air inlet component to enter the heating cavity, and a second airflow outlet communicated with the heating cavity and enabling the heated airflow to flow out from the heating cavity.

In an embodiment, the water tank is provided with a mist discharge pipe for discharging mist to the outside of the humidifier, and the mist outlet is an outlet of the mist discharge pipe; the first airflow outlet is a plurality of air outlet holes that are provided in the first cover body part and disposed close to an inlet of the mist discharge pipe, and the second airflow outlet is connected to a mist guide pipe that extends into the mist discharge pipe.

In an embodiment, the first cover body part is provided with a water receiving structure recessed toward the atomization cavity, and the water receiving structure located in the atomization cavity is configured to receive water drops excited by ultrasonic oscillation; and the water receiving structure comprises: the cover body opening provided on a top wall of the first cover body part, the top wall being a wall surface of the first cover body part away from the atomization cavity; a tubular part connected to the cover body opening, extending toward one side where the atomization cavity is located, and provided with a first through hole allowing atomized airflow to pass through; and an end part provided at one end of the tubular part away from the cover body opening, and provided with a second through hole that communicates an in-tube space with the atomization cavity.

In an embodiment, a flow guide part protrudes at the bottom of the water tank for engaging with the seat; when the water tank engages with the seat, the flow guide part abuts against the seat and encloses, with the seat, an air inlet channel for guiding gas, one end of the air inlet channel is communicated with the first airflow inlet, the other end of the air inlet channel is communicated with the heating cavity, and the air inlet component at least partially extends into the air inlet channel; a first channel section of the air inlet channel between the air inlet component and the first airflow inlet, the first airflow inlet, the space above the first water channel, and the first airflow outlet constitute the first air duct; the first channel section of the air inlet channel between the air inlet component and the first airflow inlet, the first airflow inlet, the atomization cavity, and the cover body opening constitute the second air duct; and a part of the air inlet channel located between the air inlet component and the heating cavity constitutes a part of the third air duct.

In an embodiment, an inner wall of the second cover body part is provided with an air blocking part, and the air blocking part is disposed close to the second airflow inlet, and blocks airflow entering from the second airflow inlet to change a flow direction of the airflow in the heating cavity.

In an embodiment, the water groove is communicated with the atomization cavity through the second water channel, the covering part is connected to an isolation side wall that extends into the second water channel, and the isolation side wall extends below a water surface to block cold mist of a part of the second water channel located above the water surface.

In an embodiment, a hot water cover with an opening toward the bottom of the heating cavity is provided in the heating cavity, and the hot water cover is located inside the second cover body part.

In an embodiment, the hot water cover is provided with: a water inlet hole provided at a position of the hot water cover close to the opening of the hot water cover, and communicated with a communication port of the heating cavity away from the first water channel; and a mist outlet hole provided in a top wall of the hot water cover, so that steam is capable of entering the heating cavity from a space inside the hot water cover.

In an embodiment, a flange that protrudes from a side wall of the hot water cover and extends in a circumferential direction of the hot water cover is disposed at a position of the hot water cover close to the opening of the hot water cover.

In an embodiment, at least part of the first water channel is distributed in a central area of the seat, and all parts of the first water channel are disposed far away from a side wall of the seat.

In an embodiment, the first water channel comprises:
a first part communicated with the water groove, located between the atomization cavity and a housing of the seat, and disposed close to the atomization cavity; and
a second part with one end communicated with the first part and the other end communicated with the heating cavity, having an included angle with the first part to implement the arrangement of the second part between the atomization cavity and the heating cavity, and located in the central area.

In an embodiment, an intercepting part is disposed in the first water channel, and the intercepting part reduces a circulating cross section of the first water channel.

In the humidifier according to the application, a water groove, a heating assembly, a first water channel and a first air duct are disposed on a seat. The heating assembly can heat water in a heating cavity to boil the water to generate steam, and mix the steam with cold mist to form hot mist, which is discharged out from the humidifier. The first water channel is configured to guide the water in the water groove to the heating cavity, and the first air duct can guide airflow introduced into the humidifier by an air inlet component, so that the airflow flows through the first water channel to cool the water in the first water channel. When the heat in the heating cavity is transferred to the first water channel through the water, the water in the first water channel can be purged by the airflow to cool the water, and the airflow absorbing the heat flows toward a mist outlet of the humidifier under the guidance of the first air duct to discharge the heat from the humidifier, so that the heat is not transferred in the first water channel, and cannot enter the water groove. This prevents an increase in a temperature of a humidifier housing, improves a working performance of the humidifier, so that a user may not still feel hot when touching the humidifier, thereby enabling the user to have better user experience.

BRIEF DESCRIPTION OF THE DRAWINGS

To explain the embodiments of the application or the technical solutions in the prior art more clearly, the following briefly describes the accompanying drawings required in the description of the embodiments or the prior art. Apparently, the accompanying drawings in the following description show only embodiments of the application, and a person of ordinary skill in the art may still derive other accompanying drawings based on the provided accompanying drawings without creative efforts.

In FIG. 1 to FIG. 11:
01: first air duct, 02: second air duct, 03: third air duct;
1: water tank, 2: seat, 3: mounting surface, 4: water groove, 5: heating cavity, 6: heating component, 7: atomization cavity, 8: ultrasonic atomization piece, 9: first water channel, 10: air inlet component, 11: covering part, 12: flow guide part, 13: air inlet channel, 14: mist discharge pipe, 15: second water channel, 16: hot water cover, 17: intercepting part, 18: air blocking part;
110: first cover body part, 111: second cover body part, 112: first through hole, 113: second through hole, 114: first airflow inlet, 115: first airflow outlet, 116: second airflow inlet, 117: second airflow outlet, 118: mist guide pipe, 119: isolation side wall, 120: cover body opening, 121: tubular part, 122: end part;
901: first part, 902: second part;
130: first channel section, 131: second channel section;
160: water inlet hole, 161: mist outlet hole, 162: flange.

DETAILED DESCRIPTION OF THE PREFERRED EMBODIMENT

The application provides a humidifier which can improve a working performance and enables a user to have better user experience.

The following clearly and completely describes the technical solutions in the embodiments of the application with reference to accompanying drawings in the embodiments of the application. Apparently, the described embodiments are merely some rather than all of the embodiments. All other embodiments obtained by a person of ordinary skill in the art based on the embodiments of the application without creative efforts shall fall within the protection scope of the application.

As shown in FIG. 1 to FIG. 11, an embodiment of the application provides a humidifier. The humidifier can generate at least hot mist, is provided with a mist outlet, and mainly comprises two mainly separate bodies, namely a water tank 1 and a seat 2, wherein a main structure of the water tank 1 is a water tank for accommodating water, and the separate body further comprises other structures, such as a mist discharge pipe 14 configured to discharge mist from the inside of the humidifier to the outside of the humidifier. The seat 2 is a part for mounting and supporting the water tank 1, which ensures that most of normally-operating components of the humidifier are disposed in the seat 2. After the water tank 1 is dismantled from the seat 2, the top of the seat 2 exposes a mounting surface 3 (after the water tank 1 is mounted on the seat 2, the mounting surface 3 is covered by the water tank 1), and the mounting surface 3 is provided with functional structures and functional components.

Specifically, a water groove 4 is disposed on the mounting surface 3, the water groove 4 is configured to receive and store water flowing out of the water tank 1, and the mounting surface 3 is further provided with a heating assembly.

The heating assembly is configured to heat water to generate steam, and comprises a heating cavity 5 and a heating component 6, and the heating cavity 5 is disposed on the seat 2, and is implemented by recessing the mounting surface 3 to form a recess, that is, the heating cavity 5 is a recess disposed on the mounting surface 3.

The mounting surface 3 is provided with a first water channel 9, and the first water channel 9 is an elongated recess provided on the mounting surface 3, and communicates the water groove 4 with the heating cavity 5 to guide the water in the water groove 4 into the heating cavity 5. The heating component 6 (such as a PTC heater) is disposed at the bottom of the heating cavity 5. When the water flows into the heating cavity 5, the heating component 6 at the bottom of the water can heat the water until the water boils to generate steam.

A first air duct 01 (because the first air duct is composed of a plurality of structures, when the first air duct is marked in the figure, to fully reflect a distribution method of the entire first air duct, a label is marked on an arrow that reflects an extension path of the first air duct, and a method for marking a second air duct 02 and a third air duct 03 described subsequently are the same as this.) and an air inlet component 10 for introducing airflow into the humidifier are disposed inside the humidifier, and the first air duct 01 enables the airflow introduced by the air inlet component 10 to flow through the first water channel 9. In the specific arrangement, a space above the first water channel 9 and/or a space not occupied by water in the first water channel 9 may be set as the first air duct 01. Because the water is heated in the heating cavity 5 and the first water channel 9 is communicated with the heating cavity 5, the heat in the heating cavity 5 is transferred to the first water channel 9, so that the water in the first water channel 9 reaches 70° C.-80° C., that is, the hot water in the heating cavity 5 may flow back into the first water channel 9, or even the hot water may flow back into the water groove 4, which may cause the water temperature in the water groove 4 to be excessively high. The backflow of the hot water may cause a housing of the seat 2 to have a relatively high temperature, so that blowing into the first water channel 9 through the first air duct 01 can cool the water in the first water channel 9, effectively lower the temperature of the water in the first water channel 9 and prevent heat from being transferred in the first water channel 9, and therefore the temperature of the housing of the seat 2 can be lowered. The airflow that absorbs heat flows through the first water channel 9 and then flows toward a mist outlet of the humidifier under the guidance of the first air duct 01 to discharge heat to the outside of the humidifier through the mist outlet. The structure of the air inlet component 10 is, for example, an air door with a plurality of air outlets (with the structure similar to a tee).

In the humidifier with the foregoing structure, the first air duct 01 is provided to cool the first water channel 9. When the heat in the heating cavity 5 is transferred to the first water channel 9 through the water, the water in the first water channel can be purged by the airflow to cool the water, and the airflow absorbing the heat flows toward a mist outlet of the humidifier under the guidance of the first air duct 01 to discharge the heat from the humidifier, so that the heat is not transferred in the first water channel 9, and cannot enter the water groove 4. This prevents an increase in a temperature of a humidifier housing, improves a working performance of the humidifier, so that a user may not still feel hot when touching the humidifier, thereby enabling the user to have better user experience.

The humidifier according to this embodiment further comprises: an atomization assembly provided on the seat 2; a second air duct 02 configured to communicate the air inlet component 10 with an atomization cavity 7 of the atomization assembly, and enable the airflow introduced by the air inlet component 10 to flow through the atomization cavity 7 to accelerate the flow of cold mist toward the mist outlet; and a third air duct 03 configured to communicate the air inlet component 10 with the heating cavity 5, and enable the airflow introduced by the air inlet component 10 to flow through the heating cavity 5 to accelerate the flow of the steam toward the mist outlet. The atomization assembly is configured to implement normal temperature atomization of water to generate cold mist, that is, the humidifier in this embodiment is more preferably a cold mist and hot mist humidifier that can generate both cold mist and hot mist (the hot mist is formed by mixing cold mist and steam). The atomization assembly comprises an atomization cavity 7 and an ultrasonic atomization piece 8, and the atomization cavity 7 is also implemented by recessing the mounting surface 3 to form a recess, that is, the atomization cavity 7 is another recess provided on the mounting surface 3, the atomization cavity 7 is disposed close to the water groove 4 and is communicated with the water groove 4 by using a second water channel 15, the ultrasonic atomization piece 8 is disposed at the bottom of the atomization cavity 7, and after normal temperature water in the water groove 4 flows through the second water channel 15 into the atomization cavity 7, the ultrasonic atomization piece 8 can ultrasonically oscillate the normal temperature water to generate cold mist.

In addition, the seat 2 is further provided with a second air duct 02 and a third air duct 03. The air inlet component 10 guides the airflow to the mounting surface 3, and the second air duct 02 communicates the air inlet component 10 with the atomization cavity 7, so that the airflow can be guided into the atomization cavity 7. The airflow introduced into the atomization cavity 7 by the second air duct 02 can purge the cold mist generated in the atomization cavity 7 to accelerate the flow of the cold mist to the outside of the humidifier. The third air duct 03 communicates the air inlet component 10 with the heating cavity 5, which can guide the airflow into the heating cavity 5. The airflow introduced into the heating cavity 5 can purge the steam generated in the heating cavity 5 to accelerate the flow of the steam toward the outside of the humidifier.

In the humidifier with the foregoing structure, the second air duct 02 is further provided to allow the airflow to purge the cold mist to accelerate the discharge of the cold mist to the outside of the humidifier, and the third air duct 03 is further provided to allow the airflow to purge the steam to accelerate the discharge of the steam to the outside of the humidifier, so that the steam can be discharged more quickly, and the steam can be mixed with the cold mist more quickly during the discharge process (for example, the humidifier discharges steam within one minute and the mixed mist is enabled to reach a target temperature within three minutes), so that the temperature of the mist outlet of the humidifier is increased, and a discharge height of the mist can be increased under the driving of the airflow, thereby improving the working performance of the humidifier.

In the application, as shown in FIG. 2 to FIG. 5, further preferably, the seat 2 is further provided with a covering part 11. The covering part 11 comprises a first cover body part 110 covering the atomization cavity 7 and the first water channel 9, and a second cover body part 111 covering the heating cavity 5, and by covering the heating cavity 5, the second cover body part 111 can implement sound proofing of the heating cavity 5 and prevent water from splashing out of the heating cavity 5. The first cover body part 110 and the second cover body part 111 may be integrally formed or separately provided. In the application, preferably, the first cover body part 110 and the second cover body part 111 are integrally formed.

Because the atomization cavity 7, the first water channel 9 and the heating cavity 5 are all recesses formed by recessing the mounting surface 3, and openings of the three recesses are all located on the mounting surface 3, when disposed on the seat 2, the covering part 11 covering the atomization cavity 7, the water channel 9 and the heating cavity 5 is disposed on the mounting surface 3. The first cover body part 110 of the covering part 11 is a part specially configured to cover the opening of the atomization cavity 7 and a partial opening of the first water channel 9 and match the shapes the openings of the two. The second cover body part 111 is a part specially configured to cover the opening of the heating cavity 5 and match the shape of the opening of the heating cavity 5. In addition, because the second cover body part 111 covers the opening of the heating cavity 5, noise generated during the heating of the water in the heating cavity 5 can be isolated by the second cover body part to reduce the propagation to the outside of the heating cavity 5. That is, the second cover body part 111 can implement sound proofing of the heating cavity 5 when covering the heating cavity 5, so that working noise of the humidifier can be reduced, and the working performance of the humidifier is improved. In addition, when the water is heated to a boiling state, the water may splash. Therefore, covering the opening of the heating cavity 5 with the second cover body part 111 can further block the splashed water, so as to prevent the water from splashing to the outside of the heating cavity 5, protect other parts of the humidifier, and improve the working performance of the humidifier.

As shown in FIG. 2 to FIG. 10, in the application, the first cover body part 110 is further provided with a water receiving structure recessed toward the atomization cavity 7, and the water receiving structure located in the atomization cavity 7 is configured to receive water drops excited by ultrasonic oscillation. In this structure, the first cover body part 110 covers the atomization cavity 7 and is further provided with the water receiving structure. The water receiving structure is located in the atomization cavity 7 and is disposed at the top of the ultrasonic atomization piece 8. When the ultrasonic atomization piece 8 performs ultrasonic oscillation on water, the water is excited and splashed, and the water receiving structure disposed at the top of the ultrasonic atomization piece 8 can receive the excited water splash, and prevent the water splash from directly dripping into the water, thereby reducing the sound of water splash dripping, and reducing dripping noise caused by direct falling of water drops, so that the humidifier has a better working performance. Water received by the water receiving structure flows back along a side wall of the water receiving structure and merges with the water in the atomization cavity 7.

Figure 2:
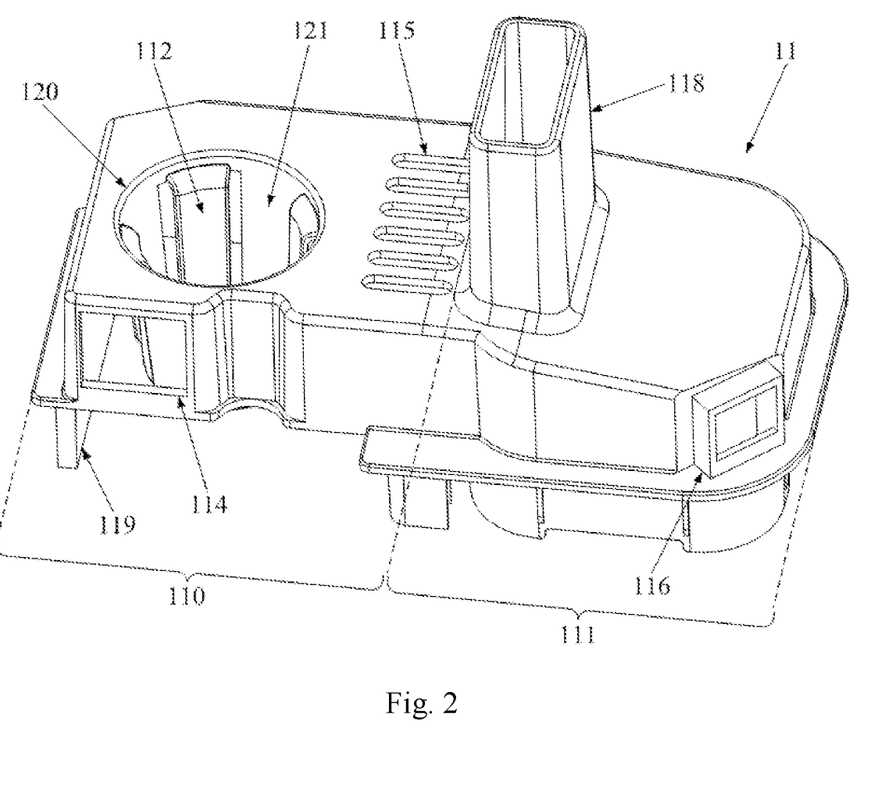
FIG. 2 is a schematic structural diagram of a covering part.
Figure 3:
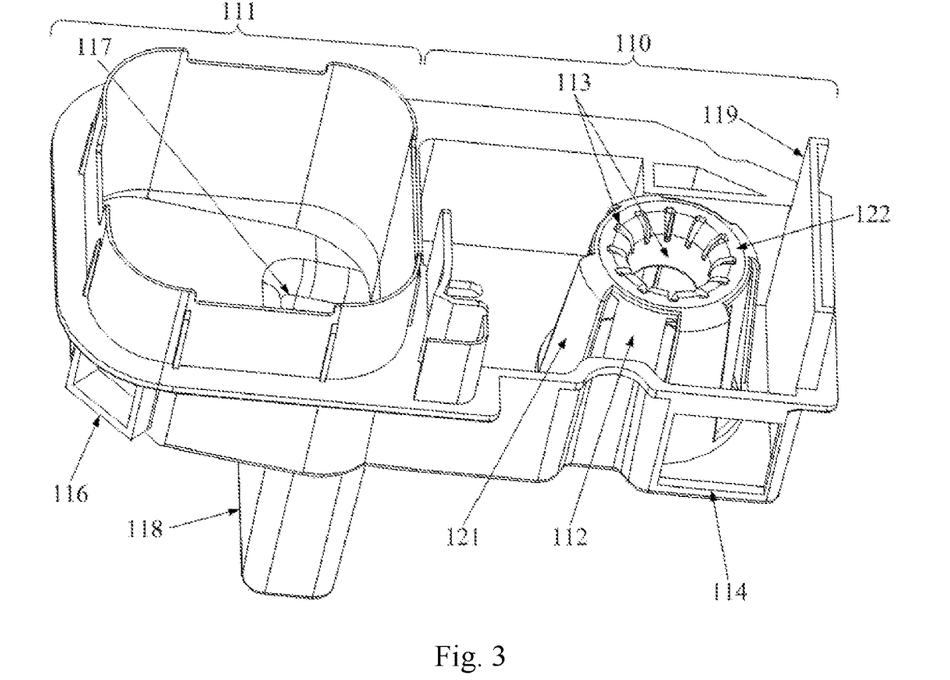
FIG. 3 is a schematic structural diagram of the covering part from another perspective.
Figure 4:
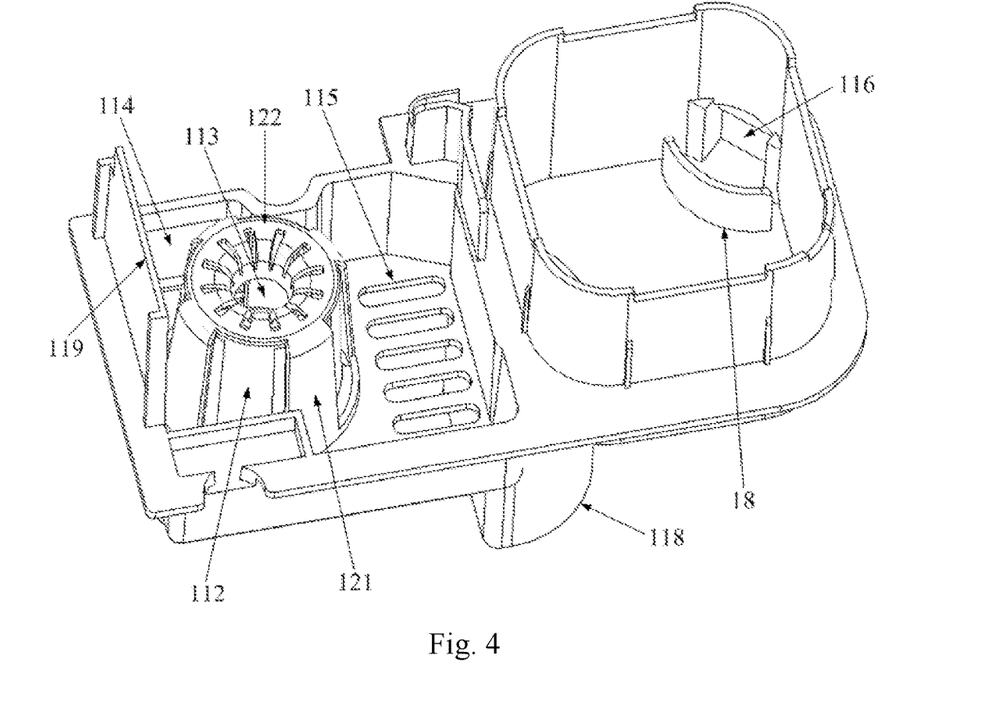
FIG. 4 is a schematic diagram of a structure in which an air blocking part is coordinated with a second airflow inlet.
Figure 5:
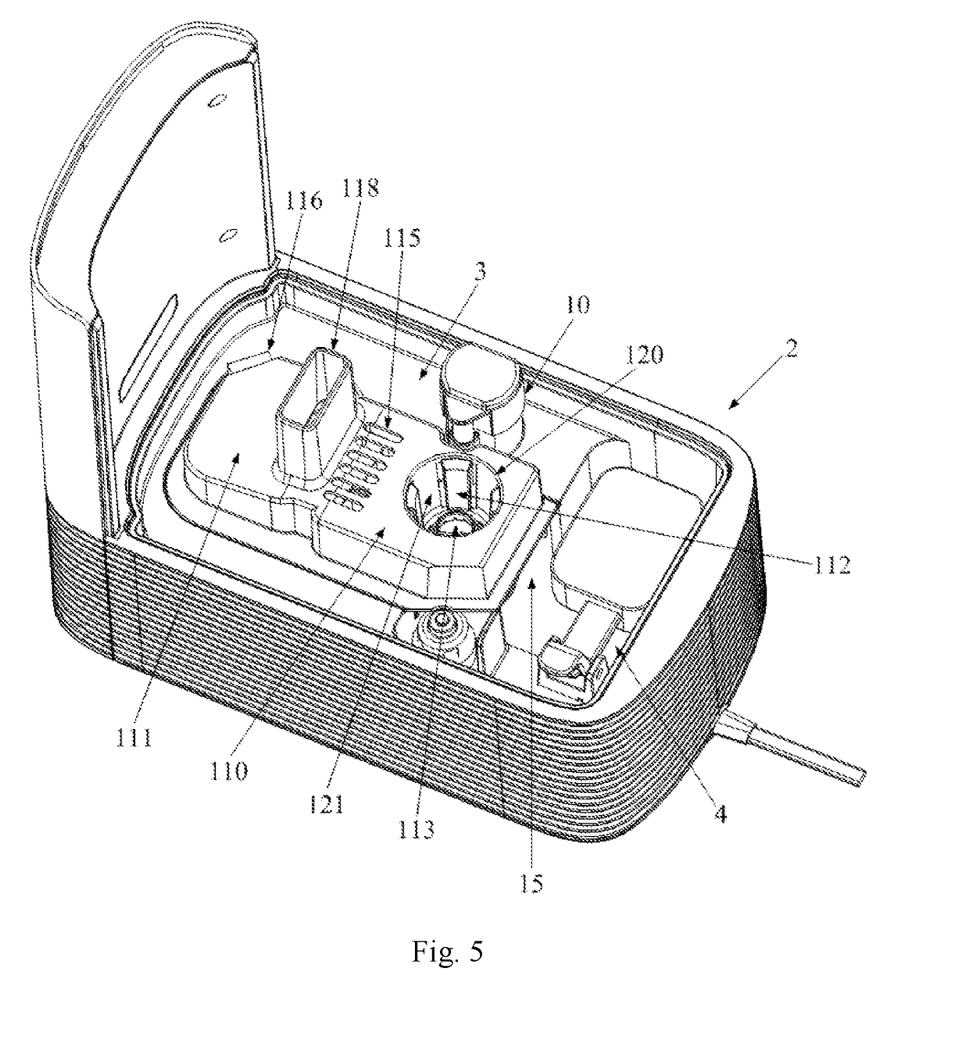
FIG. 5 is a schematic structural diagram of a seat provided with a covering part.

In this embodiment, as shown in FIG. 2 to FIG. 4, preferably, the water receiving structure comprises: a cover body opening 120 provided on a top wall of the first cover body part 110, the top wall being a wall surface of the first cover body part 110 away from the atomization cavity 7; a tubular part 121 connected to the cover body opening 120, extending into the atomization cavity 7, and provided with a first through hole 112 allowing atomized airflow (the atomized airflow refers to airflow formed by mixing the airflow entering the atomization cavity 7 with the cold mist generated in the atomization cavity 7) into an in-tube space; and an end part 122 provided at one end of the tubular part 121 away from the cover body opening 120, and provided with a second through hole 113 that communicates the in-tube space with the atomization cavity 7. In the water receiving structure with this structure, the cover body opening 120 is preferably a circular opening, and the tubular part 121 connected to a lower side of the cover body opening 120 also preferably has a circular tube structure, and more preferably has a reducing tube structure with a diameter gradually decreasing in a direction away from the cover body opening 120, and the end part 122 (without considering the second through hole 113) is a plate-shaped part that blocks a port of the tubular part 121 away from the cover body opening 120, so that the entire water receiving structure has an inverted truncated cone shape, thereby being more conducive to backflow of water. The tubular part 121 is provided with the first through hole 112, which can communicate the atomization cavity 7 with the in-tube space of the tubular part 121, so that the airflow entering the atomization cavity 7 can drive the cold mist to flow through the first through hole 112 into the in-tube space, and can flow out from the cover body opening 120 communicated with the in-tube space (the atomized airflow that flows out further enters the mist discharge pipe 14), as shown by the arrows in FIG. 6, FIG. 9 and FIG. 10. In this way, the drive and accelerated discharge of cold mist can be implemented. Specifically, to make the airflow and cold mist have a larger circulation area, as shown in FIG. 3 and FIG. 4, preferably, the first through holes 112 are each an elongated hole provided in a circumferential side wall of the tubular part 121, and the elongated hole extends to one end close to the end part 122 from one end of the tubular part 121 close to the cover body opening 120, and a plurality of first through holes 112 are disposed at equal intervals in a circumferential direction of the circumferential side wall. Due to the arrangement of the foregoing first through holes 112, when the water receiving structure receives water splash, the water splash may pass through the first through holes 112 and enter the in-tube space. Therefore, to ensure the normal backflow of the water entering the in-tube space, the end part 122 is provided with a second through hole 113, and the second through hole 113 may be a circular hole with a larger area in the center of the end part 122, or further comprise a plurality of elongated holes with a larger opening area around the central circular hole, as shown in FIG. 3 and FIG. 4.

In addition, the water receiving structure recessed in the atomization cavity 7 can further match an inner wall of the first cover body part 110 to guide the airflow entering the first cover body part, so that the airflow can blow to the first water channel 9 covered by the first cover body part 110.

Specifically, as shown in FIG. 2, FIG. 3, FIG. 4, FIG. 9 and FIG. 10, the first cover body part 110 is provided with a first airflow inlet 114 and the foregoing cover body opening 120 that are communicated with the atomization cavity 7, and the airflow introduced by the air inlet component 10 is capable of entering the atomization cavity 7 from the first airflow inlet 114 and flowing out from the cover body opening 120.

The first cover body part 110 is further provided with a first airflow outlet 114 and a first airflow outlet 115 communicated with a space above the first water channel 9. The first airflow outlet 114 enables the airflow introduced by the air inlet component 10 to enter into a position above the first water channel 9, and the airflow introduced by the air inlet component 10 is capable of flowing into the first cover body part 110 from the first airflow inlet 114 and passes above the first water channel 9 and then flows out through the first airflow outlet 115. When the atomization cavity 7 is communicated with the space above the first water channel 9, the first airflow outlet 115 can further enable the atomized airflow (the atomized airflow contains heat absorbed from the first water channel 9) to flow above the atomization cavity 7 and the first water channel 9, and finally flow out from the first airflow outlet 115.

The second cover body part 111 is provided with a second airflow inlet 116 communicated with the heating cavity 5 and enabling the airflow introduced by the air inlet component 10 to enter the heating cavity 5, and a second airflow outlet 117 communicated with heating cavity 5 and enabling the heated airflow (the heated airflow refers to airflow formed by mixing the airflow entering the heating cavity 5 with steam generated in the heating cavity 5) to flow out from the heating cavity 5. Because the atomization cavity 7 and the first water channel 9 are covered below the first cover body part 110, when the first cover body part 110 covers the atomization cavity 7 and the first water channel 9, preferably, a gap is provided between the top wall of the first cover body part 110 and the mounting surface 3, that is, a space covered by the first cover body part 110 is provided above the opening of the atomization cavity 7 and above the opening of the first water channel 9 (this space is referred to as a covered space in the following content). After entering the first cover body part 110 from the first airflow inlet 114, the airflow first flows in the atomization cavity 7 and part of the covered space above the atomization cavity 7, then a part of the airflow enters the first through hole 112 to take away the cold mist from the atomization cavity 7, and the other part of the airflow enters part of the covered space above the first water channel 9 and the first water channel 9. Because the first airflow outlet 115 is disposed at the position of the covered space above the first water channel 9, that is, the first airflow outlet 115 is located above the first water channel 9 and aligned with the first water channel 9, the airflow for purging water in this space flows out from the first airflow outlet 115 after absorbing heat, so as to take the heat away. That is, the airflow enters the atomization cavity 7 and the first water channel 9 by flowing through the first airflow inlet 114 on the side wall of the first cover body part 110. When the airflow needs to flow out of the first cover body part 110 after purging the atomization cavity 7 and the first water channel 9 to further flow toward the outside of the humidifier, it can be learned from the foregoing that the cold mist generated in the atomization cavity 7 flows through the first through hole 112 and flows out of the cover body opening 120 under the driving of the airflow. To facilitate the outflow of the airflow carrying heat after purging of the first water channel 9, preferably, the top of the first cover body part 110 is provided with a first airflow outlet 115 for leading out the airflow purging the first water channel 9, so that the cold mist and heat can flow out of the first cover body part 110 from different paths in a more targeted manner.

Certainly, because the atomization cavity 7 and the first water channel 9 that are located inside the first cover body 110 are communicated by using the covered space, the airflow entering the first cover body part 110 from the first airflow inlet 114 may flow out from the cover body opening 120 or from the first airflow outlet 115, so that the first airflow outlet 115 can also enable the atomized airflow to flow out from the atomization cavity 7 and the first water channel 9 simultaneously. Similarly, the cover body opening 120 can also enable the atomized airflow to flow out from the atomization cavity 7 and the first water channel 9 simultaneously.

The second cover body part 111 is provided with the second airflow inlet 116 and the second airflow outlet 117 to provide a flow path for the airflow to enter and exit the heating cavity 5. After the airflow enters the heating cavity 5 through the second airflow inlet 116, the steam is purged, so that the steam quickly flows out from the second airflow outlet 117. In this way, the steam can be driven to be discharged through the flow of the airflow, and the outflow speed of the steam can be significantly increased compared with when a discharge mode of natural dispersion of the steam in the prior art is adopted.

Figure 6:
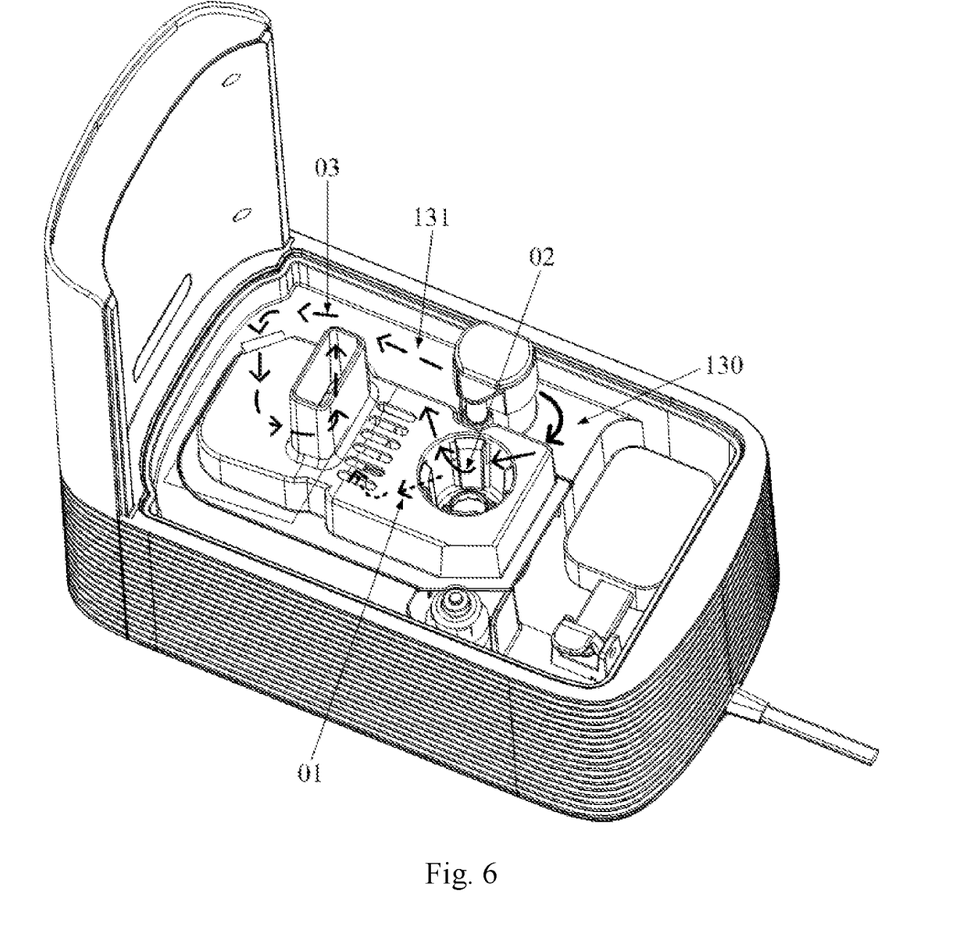
FIG. 6 is a schematic structural diagram of airflow flowing along a second air duct, a first air duct, and a third air duct respectively.
Figure 7:
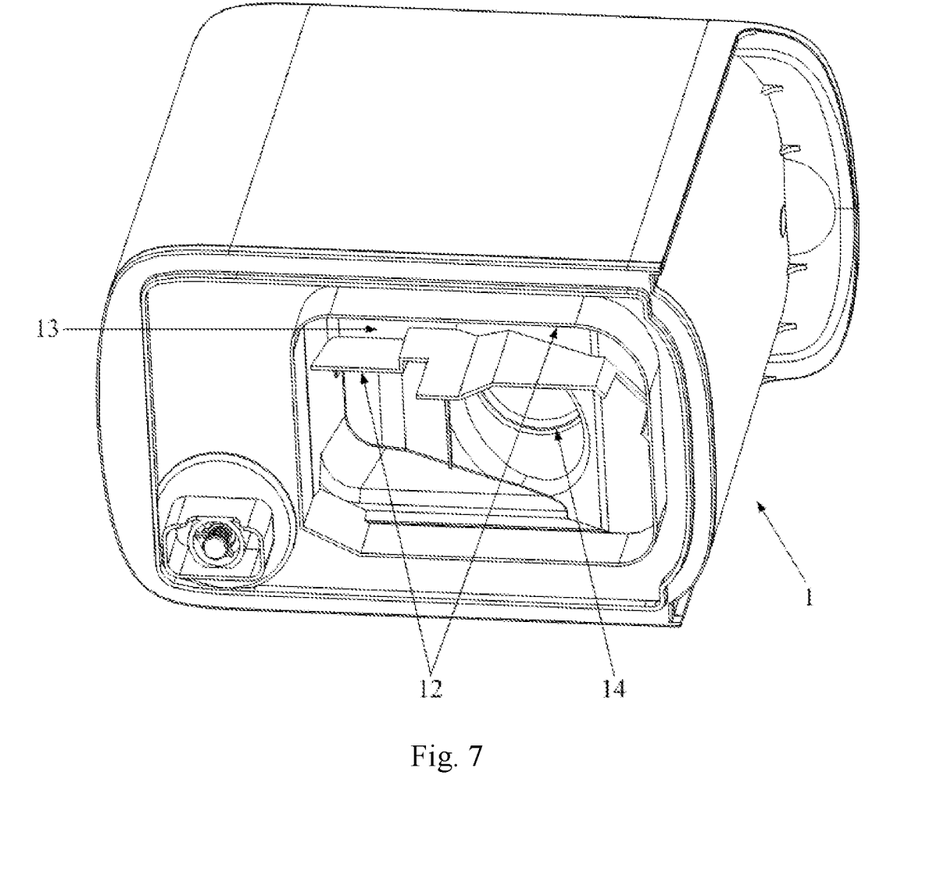
FIG. 7 is a schematic structural diagram of a water tank.
Figure 8:
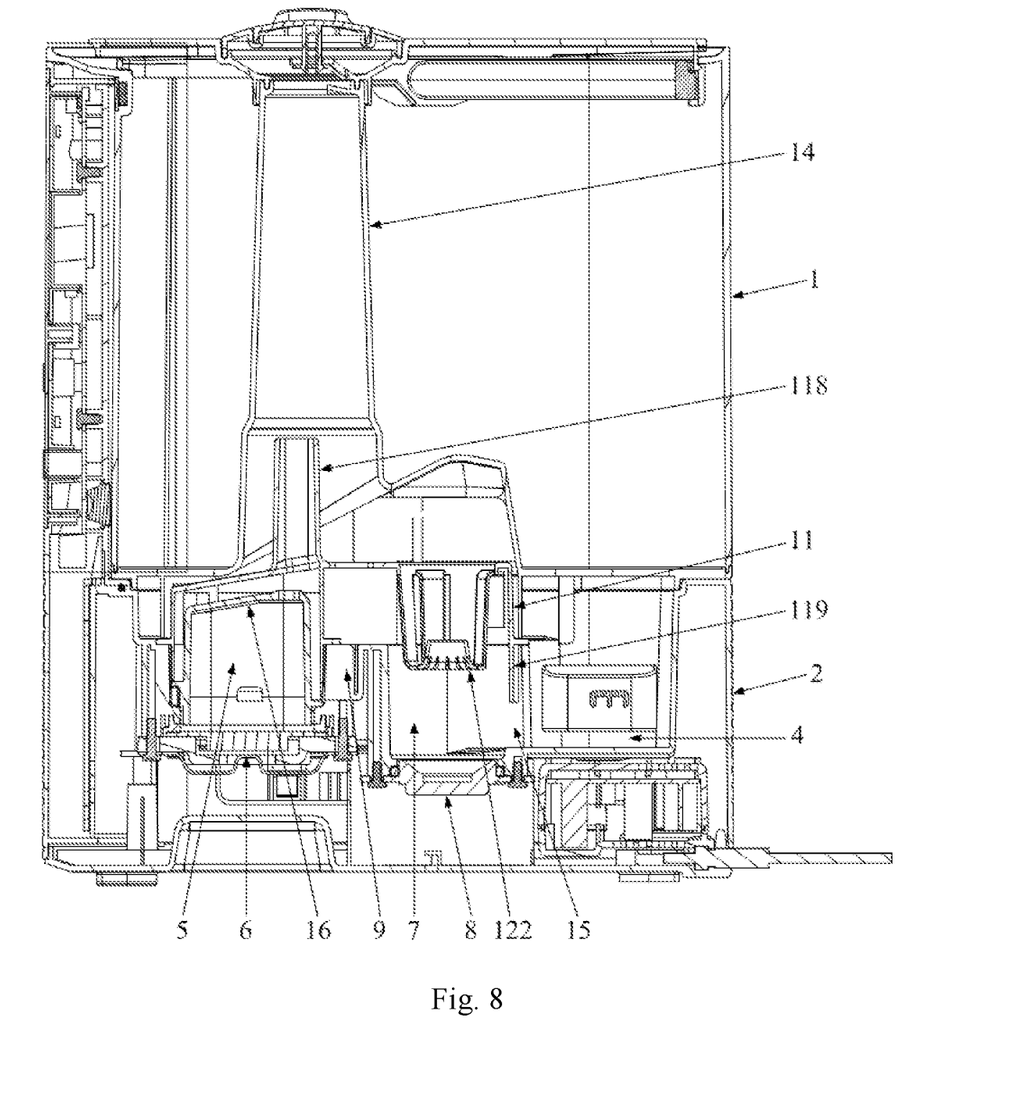
FIG. 8 is a front cross-sectional view of a humidifier.
Figure 9:
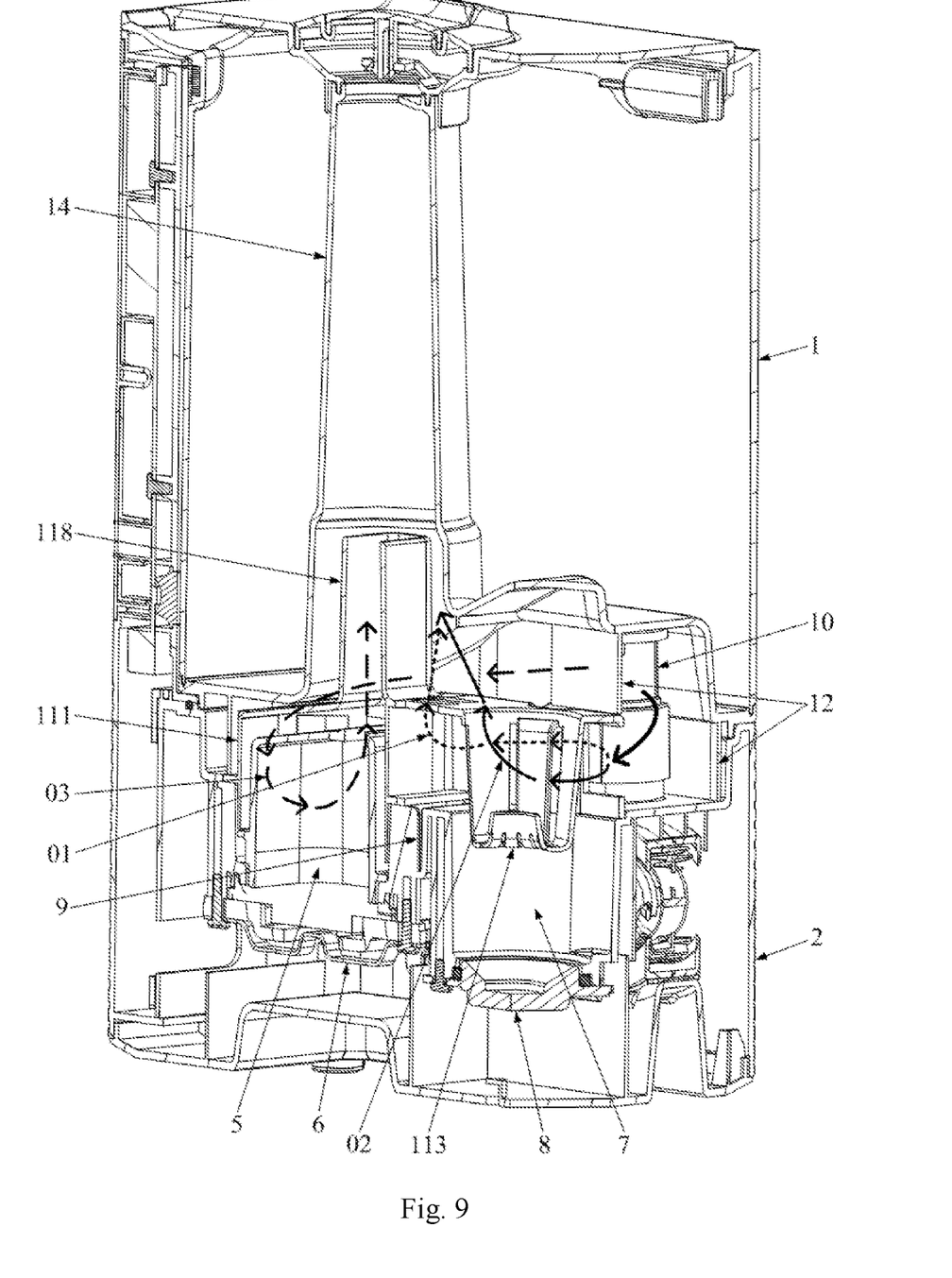
FIG. 9 is a cross-sectional view of the humidifier.

Further, as shown in FIG. 6 and FIG. 7, a flow guide part 12 protrudes at the bottom of the water tank 1 for engaging with the seat 2; when the water tank 1 engages with the seat 2, the flow guide part 12 abuts against the seat 2 and encloses, with the seat 2, an air inlet channel 13 for guiding gas, one end of the air inlet channel 13 is communicated with the first airflow inlet 114, the other end of the air inlet channel is communicated with the heating cavity 5, and the air inlet component 10 at least partially extends into the air inlet channel 13; a first channel section 130 of the air inlet channel 13 between the air inlet component 10 and the first airflow inlet 114, the first airflow inlet 114, the first water channel 9, and the first airflow outlet 115 constitute the first air duct 01; the first channel section 130 of the air inlet channel 13 between the air inlet component 10 and the first airflow inlet 114, the first airflow inlet 114, the atomization cavity 7, the first through hole 112, the in-tube space of the tubular part 121 and the cover body opening 120 constitute the second air duct 02; and a second channel section 131 of the air inlet channel 13 between the air inlet component 10 and the second airflow inlet 116, the second airflow inlet 116, the heating cavity 5 and the second airflow outlet 117 constitute a third air duct (that is, a part of the third air duct 13 between the air inlet component 10 and the heating cavity 5, which constitutes a part of the third air duct). This structure is a specific structure that constitutes the first air duct 01, the second air duct 02 and the third air duct 03. As shown in FIG. 7, the flow guide part 12 disposed at the bottom of the water tank 1 comprises two parts. One part forms an approximately rectangular ring structure, and the other part has an elongated plate-shaped structure. The plate-shaped structure is located on an inner side of the ring structure and forms the air inlet channel 13 with one side wall of the ring structure and the mounting surface 3. When the water tank 1 is placed on the seat 2, the ring structure surrounds the outside of both the covering part 11 and the air inlet component 10 when abutting against the mounting surface 3. In this way, through the blocking by the ring structure, the air sent by the air inlet component 10 can flow to only the covering part 11 and cannot flow to other positions of the mounting surface 3. In addition, the plate-shaped structure disposed inside the ring structure is located between the air inlet component 10 and the covering part 11 when abutting against the mounting surface 3, so that the air inlet component 10 is located in the air inlet channel 13. Because the air inlet component 10 has two air outlets facing the first airflow inlet 114 and the second airflow inlet 116 respectively (similar to a tee with two outlets), the air (or airflow) flows in the air inlet channel 13 toward two ends of the air inlet channel 13 in opposite directions by using an arrangement position of the air inlet component 10 as a starting point. Sections through which the two parts of the airflow in the air inlet channel 13 pass respectively are the first channel section 130 and the second channel section 131. As shown in FIG. 8 and FIG. 9, the first airflow inlet 114 provided on the first cover body part 110 is communicated with the air inlet channel 13 (the section between the two is the first channel section 130) at one end of the air inlet channel 13, and the second airflow inlet 116 provided on the second cover body part 111 is communicated with the air inlet channel 13 (the section between the two is the second channel section 131) at the other end of the air inlet channel 13. In this way, the first air duct 01 is formed through the matching between the air inlet channel 13, the first cover body part 110 and the first water channel 9, that is, as shown by thick solid arrows and arrows formed by small dots in FIG. 6, FIG. 9 and FIG. 10, a flow guide path of the first air duct 01 is the first channel section 130 of the air inlet channel 13, the first airflow inlet 114, a flow guide space of the first water channel 9 and a covered space above the same, and the first airflow outlet 115. The second air duct 02 is formed through the matching between the air inlet channel 13, the first cover body part 110 and the atomization cavity 7, that is, as shown by thick solid arrows and thin solid arrows in FIG. 6, FIG. 9 and FIG. 10, a flow guide path of the second air duct 02 is the first channel section 130 of the air inlet channel 13, the first airflow inlet 114, the atomization cavity 7, the first through hole 112 provided in the water receiving structure, the in-tube space of the tubular part 121, and the cover body opening 120. The third air duct 03 is formed through the matching of the air inlet channel 13 and the second cover body part 111, that is, as shown by dashed arrows in FIG. 6, FIG. 9, and FIG. 10, a flow guide path of the third air duct 03 is the second channel section 131 of the air inlet channel 13, the second airflow inlet 116, the heating cavity 5, and the second airflow outlet 117. It can be learned from the above that the first air duct 01 and the second air duct 02 have overlapping parts, namely, the first channel section 130 and the first airflow inlet 114 of the air inlet channel 13, that is, the first air duct 01 and the second air duct 02 share this path, and the airflow is divided after entering the covered space.

Based on the foregoing structure, when the humidifier needs to discharge cold mist, the air inlet component 10 is caused to emit air, and airflow sequentially passes through the first channel section 130 of the air inlet channel 13, the first airflow inlet 114, the atomization cavity 7, the first through hole 112 provided in the water receiving structure, the in-tube space, and the cover body opening 120. In this process, the airflow purges the cold mist generated in the atomization cavity 7 to drive the cold mist to enter the mist discharge pipe 14 after the cold mist passes through the water receiving structure, to implement discharge to the outside of the humidifier. In this process, the airflow can be controlled by the air inlet component 10 (for example, closing the air outlets toward the second channel section 131) to only flow along the first air duct 01 described above and only drive the cold mist to be discharged, or the air outlets on two sides of the air inlet component 10 may be caused to emit air, that is, part of the airflow is caused to flow through the third air duct 03. However, in this case, the heating component 6 does not heat water, that is, the heating assembly does not generate steam, and therefore the objective of only discharging cold mist can also be achieved. When the humidifier needs to discharge hot mist, the air outlets on two sides of the air inlet component 10 are caused to emit air, a part of the airflow generally flows through the first air duct 01 as described above so that the cold mist enters the mist discharge pipe 14, and the other part of the airflow sequentially flows through the second channel section 131 of the air inlet channel 13, the second airflow inlet 116, the heating cavity 5, and the second airflow outlet 117. In this process, the airflow purges the steam (heated airflow) generated in the heating cavity 5 to drive the steam into the mist discharge pipe 14, and the steam and cold mist entering the mist discharge pipe 14 are mixed in the mist discharge pipe 14 to generate hot mist with a moderate temperature.

In this embodiment, further preferably, one of the two air outlets of the air inlet component 10 facing the first airflow inlet 114 has a larger opening area, and the other air outlet facing the second airflow inlet 116 has a smaller opening area, so that the quantity of airflow flowing to the atomization cavity 7 is greater than the quantity of airflow flowing to the heating cavity 5, to discharge the cold mist and heat more fully, and the atomization cavity 7 can also be a main atomization cavity of the humidifier.

In the application, as shown in FIG. 7 and FIG. 8, the water tank 1 is provided with a mist discharge pipe 14 for discharging mist to the outside of the humidifier, and the mist outlet is an outlet of the mist discharge pipe 14; the first airflow outlet 115 is a plurality of air outlet holes that are provided in the first cover body part 110 and disposed close to an inlet of the mist discharge pipe 14, and the second airflow outlet 117 is connected to a mist guide pipe 118 that extends into the mist discharge pipe 14. The mist discharge pipe 14 is a component for discharging mist to the outside of the humidifier and mixing steam with cold mist. Arranging the first airflow outlet 115 close to the mist discharge pipe 14 (preferably aligned with each other) is more conductive to discharging the heat to the outside of the humidifier, so that the water in the first water channel 9 can be cooled in time. In addition, in the application, to discharge heat more timely and fully, and improve heat discharge efficiency, as shown in FIG. 2, FIG. 4 and FIG. 9, preferably, the second airflow outlet 117 includes a plurality of air outlet holes that run through a top wall of the first cover body part 110, and the air outlet holes are elongated holes with a larger opening area. In addition, because the atomization cavity 7 and the first water channel 9 simultaneously covered by the first cover body part 110 are communicated inside the first cover body part 110, the first airflow outlet 115 for discharging heat may not be specifically arranged, but the heat is discharged through the first through hole 112, the in-tube space and the cover body opening 120 of the water receiving structure under the driving of the airflow. The mist guide pipe 118 communicated with the second airflow outlet 117 protrudes on the second cover body part 111, and the mist guide pipe 118 extends into the mist discharge pipe 14, which can not only more fully introduce the steam to the mist discharge pipe 14, but also avoid a heat loss, so that the working effect of the humidifier is improved. Specifically, the overall length of the mist guide pipe 118 and the length thereof extending into the mist discharge pipe 14 can be adjusted according to actual work requirements, which is not limited in the application.

More preferably, as shown in FIG. 4, an inner wall of the second cover body part 111 is provided with an air blocking part 18, and the air blocking part 18 is disposed close to the second airflow inlet 116, is preferably aligned with the second airflow inlet 116, and blocks airflow entering from the second airflow inlet 116 to change a flow direction of the airflow in the heating cavity 5. The air blocking part 18 is a plate-shaped part. The air blocking part 18 is disposed on an inner wall of the second cover body part 111 and is aligned with the second airflow inlet 116, so that the air blocking part 18 can block airflow entering from the second airflow inlet 116, to disturb the airflow and change the flow direction of the airflow. Therefore, the airflow can flow in the heating cavity 5 disorderly in a plurality of directions to more fully purge the hot water surface and the internal space of the heating cavity 5, thereby promoting the flow of steam to the second airflow outlet 117 and preventing the steam from flowing back out of the heating cavity 5 from the second airflow inlet 116.

As shown in FIG. 1 to FIG. 4, FIG. 8 and FIG. 10, the water groove 4 is communicated with the atomization cavity 7 through the second water channel 15, and a covering portion (specifically, a top wall of the covering part) of the first cover body part 110 is connected with an isolation side wall 119 extending into the second water channel 15. An edge of the isolation side wall 119 away from the top wall can extend below the water surface in the second water channel 15, so as to block a part of the second water channel 15 above the water surface, and therefore cold mist can be prevented from diffusing from the atomization cavity 7 into the water groove 4. Because the water groove 4 and the atomization cavity 7 are adjacently disposed and communicated through the second water channel 15, cold mist generated in the atomization cavity 7 may diffuse to the water groove 4 through the second water channel 15, which results in waste of the cold mist. Therefore, to avoid the occurrence of this situation, in the application, preferably, the bottom of the top wall of the first cover body part 110 is provided with the isolation side wall 119 extending downward. When the first cover body part 110 covers the atomization cavity 7 and the first water channel 9, the isolation side wall 119 extends into the second water channel 15. In addition, because water exists in the second water channel 15 and the cold mist diffuses above the water surface, when the isolation side wall 119 is used to block the second water channel 15, the isolation side wall 119 only needs to extend to below the water surface from the mounting surface 3, and does not need to extend to a bottom wall of the second water channel 15.

It can be learned from the above that the covering part 11 in the application is a comprehensive component that can achieve a plurality of functions such as noise reduction, heat transfer prevention and air duct formation. The component disposed in the humidifier can improve performances of the humidifier in many aspects, and significantly improve a use effect of the humidifier. Preferably, the covering part 11 has an integral structure, and the material thereof is preferably soft plastic, or may be hard plastic or the like.

Figure 11:
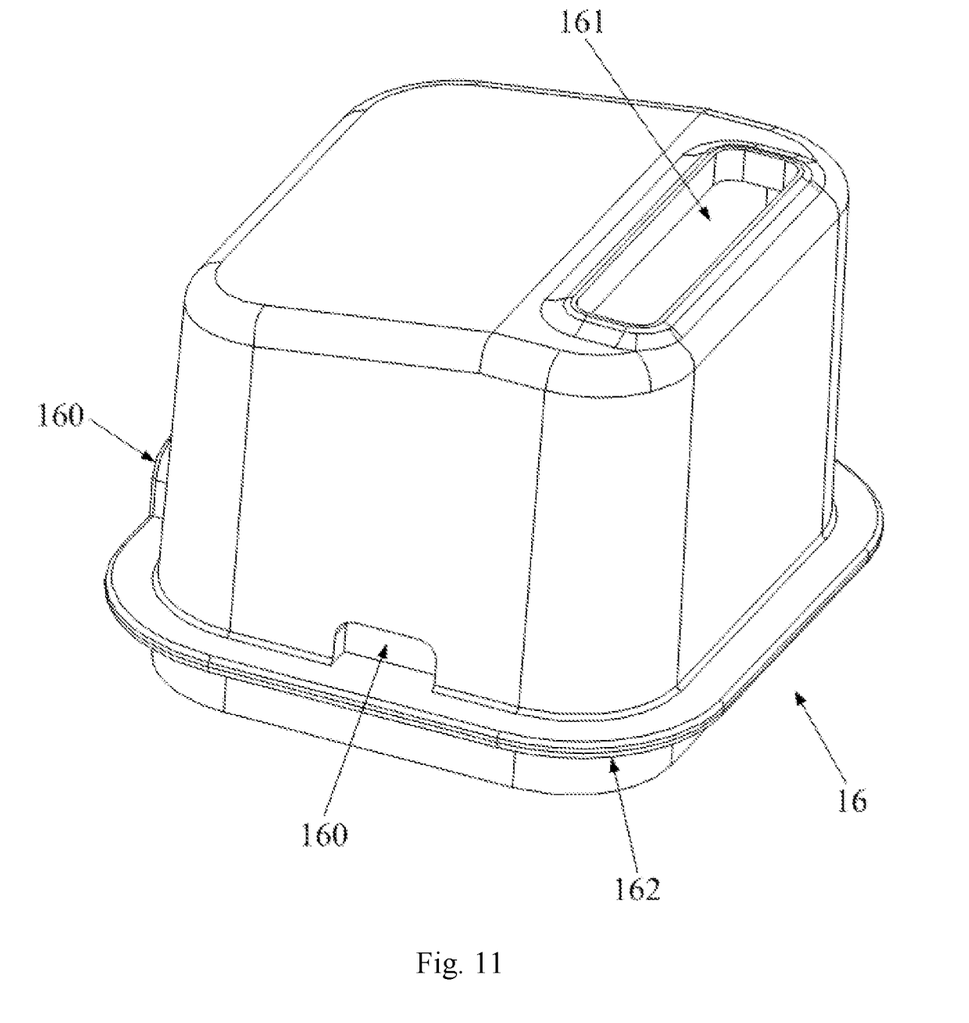
FIG. 11 is a schematic structural diagram of a hot water cover.

Further preferably, as shown in FIG. 8 and FIG. 11, a hot water cover 16 with an opening toward the bottom of the heating cavity 5 is provided in the heating cavity 5, and the hot water cover 16 is located inside the second cover body part 111. The hot water cover 16 is preferably a polygonal barrel-shaped cover body formed by a plurality of side walls, such as a quadrangular barrel-shaped cover body shown in FIG. 11, and the material thereof is also preferably plastic. The hot water cover 16 is added into the heating cavity 5 because the hot water cover 16 with a downward opening can cover the water in the heating cavity 5, thereby isolating noise during the process of heating and boiling of water. The hot water cover 16 can further form a double-layer plastic cover with the second cover body part 111. In this way, the noise generated during the water heating process can be isolated to a greater extent, so that the humidifier has a better mute effect.

Figure 10:
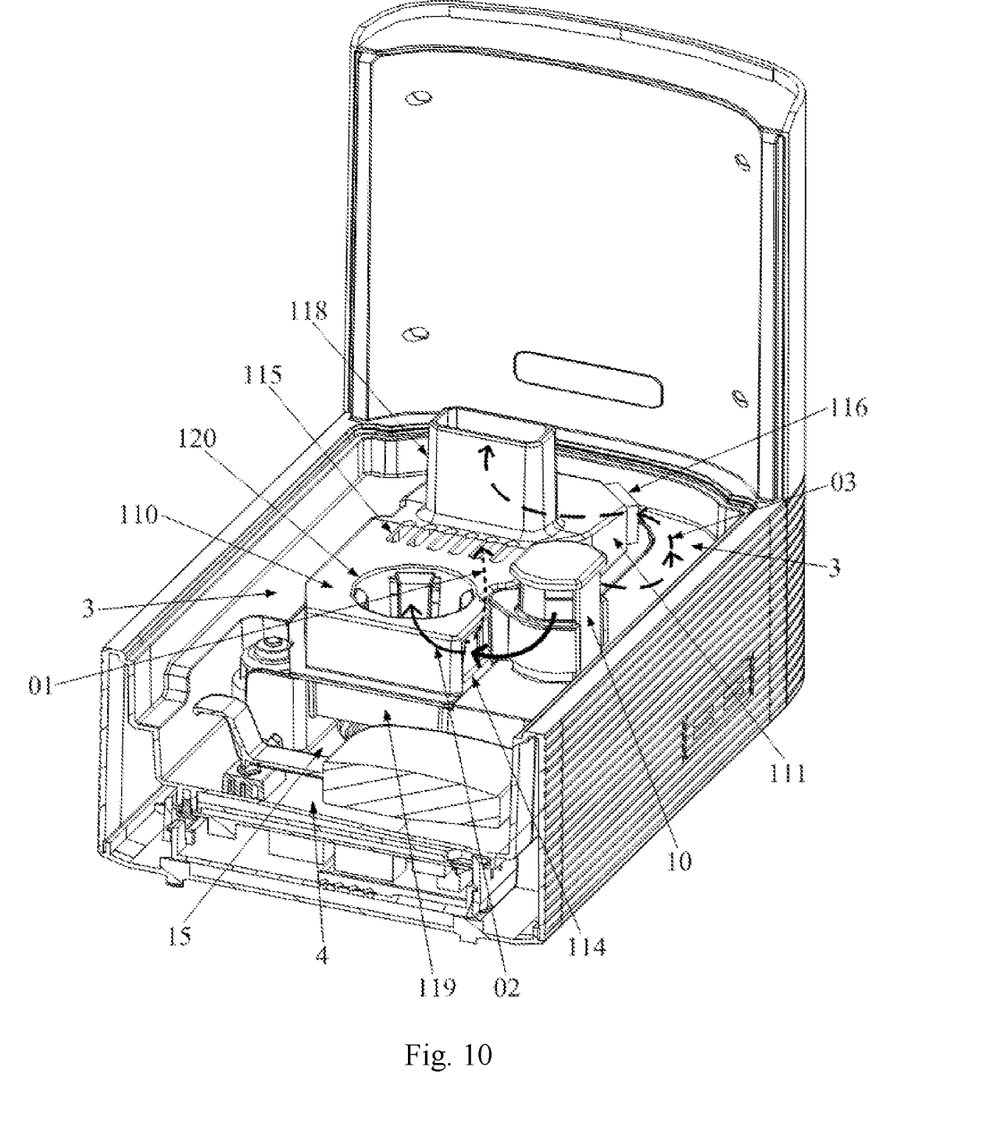
FIG. 10 is a schematic diagram of a structure in which an isolation side wall blocks the second water channel.

As shown in FIG. 11, the hot water cover 16 is provided with: a water inlet hole 160 provided at a position of the hot water cover 16 close to the opening of the hot water cover 16 (in the following content, this opening is referred to as the opening of the hot water cover), and communicated with a communication port of the heating cavity 5 away from the first water channel 9; and a mist outlet hole 161 provided in a top wall of the hot water cover 16, so that steam is capable of entering the heating cavity 5 from a space inside the hot water cover 16. In this structure, because the opening of the hot water cover is located at the bottom of the heating cavity 5, the water inlet hole 160 is provided at a position of the hot water cover 16 close to the opening of the hot water cover, so that the water inlet hole 160 is also located in the middle and lower part of the heating cavity 5, and therefore the water can enter the hot water cover 16 more conveniently. In addition, when the side wall of the hot water cover 16 is provided with the water inlet hole 160, the water inlet hole 160 is preferably kept away from the communication port of the first water channel 9 that is communicated with the heating cavity 5, so that a distance between the water inlet hole 160 and the first water channel 9 can be increased, and the difficulty of hot water flowing into the first water channel 9 in the hot water cover 16 can be increased, thereby further lowering the water temperature in the first water channel 9, and better avoiding the increase in the temperature of the humidifier housing. The mist outlet hole 161 is provided in a top wall of the hot water cover 16 close to the second cover body part 111, so that steam generated when the water boils can pass through the mist outlet hole 161 and flow to the second airflow outlet 117, which is beneficial to the discharge of the steam. Many options are available for the structure of the mist outlet hole 161. For example, as shown in FIG. 10, the mist outlet hole 161 may be an elongated hole provided in the top wall and having a larger opening area, or may be a plurality of circular holes or square holes having a smaller opening area and uniformly distributed in the top wall, to make the top wall a grid structure.

In addition, the hot water cover 16 is provided with the water inlet hole 160, which further enables water in the first water channel 9 to slowly flow into the hot water cover 16 through the water inlet hole 160. Because the flow rate of the water at the water inlet hole 160 is relatively slow, the water inlet hole 160 can further function to reduce heat return, so that the water temperature in the first water channel 9 is not excessively high. Certainly, in the application, a main way to reduce or even prevent heat transfer to the water groove 4 and the housing is to make airflow flow through the first air duct above the first water channel 9 to cool the water in the first water channel 9.

To increase the structural strength of the hot water cover 16, as shown in FIG. 11, in the application, further preferably, a flange 162 that protrudes from a side wall of the hot water cover 16 and extends in a circumferential direction of the hot water cover 16 is disposed at a position of the hot water cover 16 close to the opening, functions like a reinforcing rib, and can prevent the hot water cover 16 from being deformed in a high temperature environment.

Figure 1:
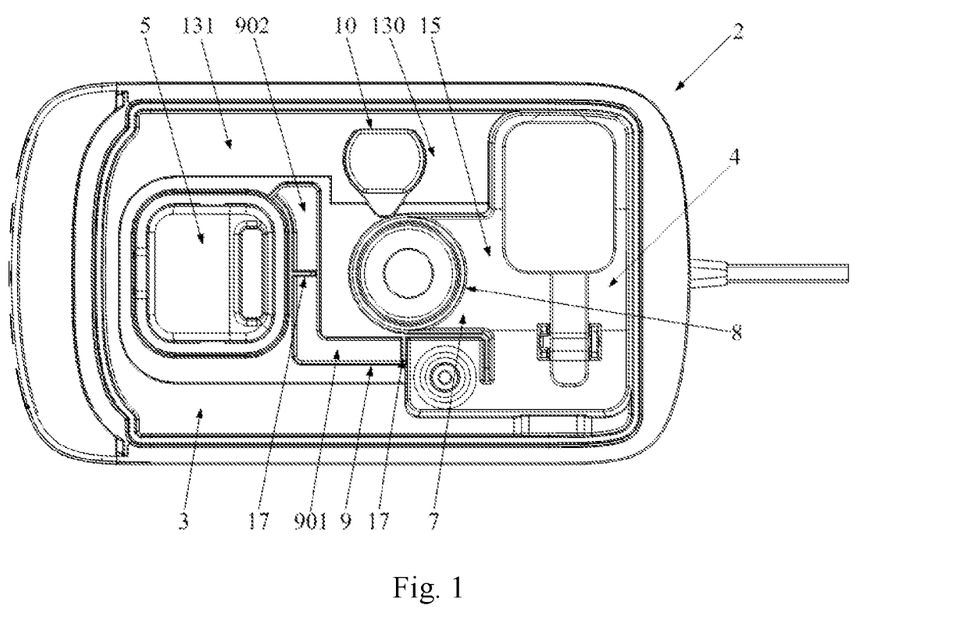
FIG. 1 is a top view of a seat of a humidifier according to an embodiment of the application.

For the first water channel 9 disposed on the mounting surface 3, in the application, preferably, at least part of the first water channel 9 is distributed in a central area of the seat 2, and all parts of the first water channel 9 are disposed far away from a side wall of the seat 2. As shown in FIG. 1, the first water channel 9 cannot extend in a straight line due to the restriction of arrangement positions of the water groove 4, the heating cavity 5 and the atomization cavity 7 on the mounting surface 3, that is, the first water channel 9 is a bent water channel. To prevent the temperature increase of the housing of the seat 2 caused by the increase of the temperature of the water in the first water channel 9, the first water channel 9 is disposed on the mounting surface 3 based on such a principle that the first water channel 9 is disposed far away from the side wall of the seat 2 to the largest extent, so as to reduce the heat transfer to the housing. However, because the first water channel 9 is a bent water channel, to minimize the probability of heat transfer to the housing, in the application, a section of the first water channel 9 between the heating cavity 5 and the atomization cavity 7 and with a larger extension length is distributed in the central area of the seat 2, as shown in FIG. 1.

As shown in FIG. 1, the first water channel 9 includes: a first part 901 communicated with the water groove, located between the atomization cavity 7 and the housing of the seat 2, and disposed closer to the atomization cavity 7 relative to the housing; and a second part 902 with one end communicated with the first part 901 and the other end communicated with the heating cavity 5, having an included angle with the first part 901 to implement the arrangement between the atomization cavity 7 and the heating cavity 5, and located in the central area. This arrangement enables the second part 902 of the first water channel 9 to be located in the central area of the mounting surface 3, so that the second part 902 is relatively far away from the housing around the seat 2. The first part 901 needs to be communicated with the water groove 4 and the water groove 4 is disposed close to the atomization cavity 7, so that the first part 901 inevitably needs to be disposed between the atomization cavity 7 and the housing of one side wall of the seat 2. However, to reduce heat transfer to the housing, when the first part 901 is disposed, the first part 901 is disposed to be parallel to the housing of one side wall of the seat 2 and away from the housing to the largest extent, that is, the first part 901 is disposed closer to the atomization cavity 7. Through such an arrangement of the first water channel 9, the first water channel 9 can keep a largest distance from the housing as a whole, thereby reducing the heat transfer to the housing to the largest extent, and improving user experience to the largest extent.

In the application, to further reduce the heat transfer in the first water channel 9, as shown in FIG. 1, preferably, an intercepting part 17 is disposed in the first water channel 9, and the intercepting part 17 reduces a circulating cross section of the first water channel 9. The intercepting part 17 is preferably a plate-shaped part, is disposed on one side wall of the first water channel 9 perpendicular to an extending direction of the first water channel 9, and has only a smaller gap with the other side wall of the first water channel 9, so that the intercepting part 17 can block and intercept the hot water in the first water channel 9, and prevent reverse flow of the hot water and reverse heat transfer. More preferably, as shown in FIG. 1, the entire first water channel 9 is provided with a plurality of intercepting parts 17, the plurality of intercepting parts 17 are distributed at different positions of the first water channel 9, so as to implement multiple interception at a plurality of different positions of the first water channel 9 and reduce heat transfer to the water groove 4 and the housing to the largest extent.

In the application, preferably, a fan for driving gas to flow to the air inlet component 10 is disposed in the seat 2. That is, the fan for driving the air flow is disposed in the seat 2 to provide airflow for the second air duct, the first air duct, and the third air duct, so that cold mist, heat and steam can be discharged more efficiently. In addition, airflow may also be provided by an external component. For example, an air inlet pipe communicated with the air inlet component 10 is disposed on the seat 2, an air inlet port is disposed on the housing of the seat 2, and an air source is externally connected to the air inlet port to provide airflow to the second air duct, the first air duct, and the third air duct. Because the humidifier provided with a fan has a more complete structure and is easy to use, preferably, in the application, one or more fans are added inside the humidifier to provide airflow.

In this specification, the structure of each part is described in a progressive manner. The description on the structure of each part focuses on the difference from an existing structure. The overall structure of the humidifier can be obtained by arbitrarily combining the structures of the foregoing parts.

The foregoing description of the disclosed embodiments enables a person skilled in the art to implement or use the application. Various modifications to these embodiments will be readily figured out by a person skilled in the art, and the general principles defined herein may be implemented in other embodiments without departing from the spirit or scope of the application. Therefore, the application will not be limited to the embodiments shown herein, but should conform to the widest scope consistent with the principles and novel features disclosed herein.

What is claimed is:

1. A humidifier with a mist outlet, comprising:
   a water tank;
   a seat provided with a water groove for receiving water flowing out of said water tank and a heating cavity for heating said water;
   a first water channel provided on said seat, and configured to communicate said water groove with said heating cavity, so that said water is capable of flowing into said heating cavity from said water groove;
   a first air duct enabling airflow introduced by an air inlet component to flow through said first water channel to cool said water in said first water channel, and enabling said airflow to flow to said mist outlet after flowing through said first water channel;
   an atomization cavity provided on said seat;
   a second air duct configured to communicate said air inlet component with said atomization cavity, and enable said airflow introduced by said air inlet component to flow through said atomization cavity to accelerate the flow of mist toward said mist outlet; and
   a third air duct configured to communicate said air inlet component with said heating cavity, and enable said airflow introduced by said air inlet component to flow through said heating cavity to accelerate the flow of heated airflow toward said mist outlet,
   wherein said seat is provided with a covering part, and said covering part comprises a first cover body part covering said atomization cavity and said first water channel, wherein said first cover body part is provided with a first airflow inlet and a cover body opening that are communicated with said atomization cavity, and said airflow introduced by said air inlet component is capable of entering said atomization cavity from said first airflow inlet and flowing out from said cover body opening;

wherein said first cover body part is further provided with a first airflow outlet communicated with said first airflow inlet and a space above said first water channel, and said airflow introduced by said air inlet component is capable of flowing into said first cover body part from said first airflow inlet and passes above said first water channel and then flows out through said first airflow outlet.

2. The humidifier, as recited in claim 1, wherein said covering part further comprises a second cover body part covering said heating cavity, and by covering said heating cavity, said second cover body part is capable of implementing sound proofing of said heating cavity and preventing water from splashing out from said heating cavity, and said second cover body part is provided with a second airflow inlet communicated with said heating cavity and enabling said airflow introduced by said air inlet component to enter said heating cavity, and a second airflow outlet communicated with said heating cavity and enabling said heated airflow to flow out from said heating cavity.

3. The humidifier, as recited in claim 2, wherein said water tank is provided with a mist discharge pipe for discharging mist to an outside of said humidifier, and said mist outlet is an outlet of said mist discharge pipe; said first airflow outlet being a plurality of air outlet holes provided in said first cover body, said second airflow outlet being connected to a mist guide pipe that extends into said mist discharge pipe.

4. The humidifier, as recited in claim 1, wherein said first cover body part is provided with a water receiving structure recessed toward said atomization cavity, and said water receiving structure located in said atomization cavity is configured to receive water drops excited by ultrasonic oscillation; and said water receiving structure comprises:
  said cover body opening provided on a top wall of said first cover body part, said top wall being a wall surface of said first cover body part away from said atomization cavity;
  a tubular part connected to said cover body opening, extending toward a side where said atomization cavity is located, and provided with a first through hole allowing atomized airflow to pass through; and
  an end part provided at an end of said tubular part away from said cover body opening, and provided with a second through hole that communicates an in-tube space with said atomization cavity.

5. The humidifier, as recited in claim 1, wherein a flow guide part protrudes at a bottom of said water tank for engaging with said seat; when said water tank engages with said seat, said flow guide part abuts against said seat and encloses, with said seat, an air inlet channel for guiding gas, an end of said air inlet channel is communicated with said first airflow inlet, an other end of said air inlet channel is communicated with said heating cavity, and said air inlet component at least partially extends into said air inlet channel;

a first channel section of said air inlet channel between said air inlet component and said first airflow inlet, said first airflow inlet, said space above said first water channel, and said first airflow outlet constitute said first air duct;
  said first channel section of said air inlet channel between said air inlet component and said first airflow inlet, said first airflow inlet, said atomization cavity, and said cover body opening constitute said second air duct; and
  a part of said air inlet channel located between said air inlet component and said heating cavity constitutes a part of said third air duct.

6. The humidifier, as recited in claim 2, wherein an inner wall of said second cover body part is provided with an air blocking part which is arranged to block airflow entering from said second airflow inlet to change a flow direction of said airflow in said heating cavity.

7. The humidifier, as recited in claim 1, wherein said water groove is communicated with said atomization cavity through said second water channel, said covering part is connected to an isolation side wall that extends into said second water channel, and said isolation side wall extends below a water surface to block cold mist of a part of said second water channel located above said water surface.

8. A humidifier with a mist outlet, comprising:
  a water tank;
  a seat provided with a water groove for receiving water flowing out of said water tank and a heating cavity for heating said water;
  a first water channel provided on said seat, and configured to communicate said water groove with said heating cavity, so that said water is capable of flowing into said heating cavity from said water groove; and
  a first air duct enabling airflow introduced by an air inlet component to flow through said first water channel to cool said water in said first water channel, and enabling said airflow to flow to said mist outlet after flowing through said first water channel, wherein a hot water cover with an opening toward a bottom of said heating cavity is provided in said heating cavity, and said hot water cover is located inside said second cover body part,
wherein said hot water cover is provided with:
  a water inlet hole provided on said hot water cover, and communicated with a communication port of said heating cavity away from said first water channel; and
  a mist outlet hole provided in a top wall of said hot water cover, so that steam is capable of entering said heating cavity from a space inside said hot water cover.

* * * * *